United States Patent
Miyama et al.

(10) Patent No.: US 9,755,560 B2
(45) Date of Patent: Sep. 5, 2017

(54) MULTIGROUP, MULTIPHASE DRIVING SYSTEM AND DRIVING METHOD FOR ROTARY ELECTRIC MACHINE

(71) Applicant: MITSUBISHI ELECTRIC CORPORATION, Chiyoda-ku (JP)

(72) Inventors: Yoshihiro Miyama, Chiyoda-ku (JP); Moriyuki Hazeyama, Chiyoda-ku (JP); Akihiro Daikoku, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/123,936

(22) PCT Filed: May 27, 2015

(86) PCT No.: PCT/JP2015/065259
§ 371 (c)(1),
(2) Date: Sep. 6, 2016

(87) PCT Pub. No.: WO2015/182659
PCT Pub. Date: Dec. 3, 2015

(65) Prior Publication Data
US 2017/0019050 A1     Jan. 19, 2017

(30) Foreign Application Priority Data
May 30, 2014   (JP) .................. 2014-112579

(51) Int. Cl.
*G01R 31/02* (2006.01)
*H02H 3/04* (2006.01)
(Continued)

(52) U.S. Cl.
CPC ............... *H02P 25/18* (2013.01); *H02P 6/17* (2016.02); *H02P 25/22* (2013.01); *H02P 27/08* (2013.01)

(58) Field of Classification Search
CPC .................................. H02P 25/18; H02P 6/17
(Continued)

(56) References Cited

U.S. PATENT DOCUMENTS

| 5,549,172 A | * | 8/1996 | Mutoh | B60L 11/18 180/65.1 |
| 9,231,504 B2 | * | 1/2016 | Fuller | H02P 6/10 |

(Continued)

FOREIGN PATENT DOCUMENTS

| JP | 5-103497 A | 4/1993 |
| JP | 7-264822 A | 10/1995 |

(Continued)

OTHER PUBLICATIONS

Decision to Grant a Patent dated May 13, 2016, issued in Japanese Patent Application No. 2015-550101 (with English translation).

(Continued)

*Primary Examiner* — Erick Glass
(74) *Attorney, Agent, or Firm* — Oblon, McClelland, Maier & Neustadt, L.L.P.

(57) ABSTRACT

A multigroup, multiphase driving system includes a power converter that converts direct current power into alternating current power and vice versa, a direct current power supply connected to a direct current side of the power converter to be charged with and discharge direct current power, and a rotary electric machine connected to an alternating current side of the power converter and including a plurality of groups of multiphase armature windings, and further including a determination unit that determines the number of groups to be used to drive the rotary electric machine on the basis of a rotation speed of the rotary electric machine, a current flowing through the rotary electric machine, a direct current power supply voltage of the direct current power supply, and a carrier frequency of the power converter, the multigroup, multiphase driving system overall loss in the system can be reduced.

17 Claims, 9 Drawing Sheets

(51) Int. Cl.
  *H02K 11/00*  (2016.01)
  *H02P 25/18*  (2006.01)
  *H02P 6/17*  (2016.01)
  *H02P 25/22*  (2006.01)
  *H02P 27/08*  (2006.01)

(58) Field of Classification Search
  USPC .......................................................... 318/490
  See application file for complete search history.

(56) References Cited

U.S. PATENT DOCUMENTS

| | | | |
|---|---|---|---|
| 9,692,343 B2* | 6/2017 | Kuramitsu | ............... H02P 25/22 |
| 2009/0302792 A1* | 12/2009 | Osada | ................... H02P 29/032 |
| | | | 318/400.21 |
| 2011/0101906 A1* | 5/2011 | Tagome | ................... H02K 3/28 |
| | | | 318/722 |
| 2014/0009101 A1 | 1/2014 | Dietl | |

FOREIGN PATENT DOCUMENTS

| | | | |
|---|---|---|---|
| JP | 2006-129668 A | 5/2006 |
| JP | 2008-5603 A | 1/2008 |
| JP | 2008-283809 A | 11/2008 |
| JP | 2010-233392 A | 10/2010 |

OTHER PUBLICATIONS

International Search Report dated Aug. 18, 2015, in PCT/JP2015/065259 filed May 27, 2015.

* cited by examiner

MULTIGROUP, MULTIPHASE DRIVING SYSTEM AND DRIVING METHOD FOR ROTARY ELECTRIC MACHINE

TECHNICAL FIELD

This invention relates to a multigroup, multiphase driving system having a rotary electric machine that includes a plurality of groups of multiphase armature windings, and a driving method for the rotary electric machine.

BACKGROUND ART

A conventional multigroup, multiphase driving system includes a power converter that converts direct current power into alternating current power and vice versa, a direct current power supply connected to a direct current side of the power converter so as to be charged with and discharge direct current power, and a rotary electric machine that is connected to an alternating current side of the power converter and includes a plurality of groups of multiphase armature windings. When a load exerted on the multigroup, multiphase driving system is large, the rotary electric machine is driven using all of the groups, and when the load is small, the rotary electric machine is driven using only some of the groups. As a result, an improvement in efficiency is achieved at a low load (see PTL 1, for example).

CITATION LIST

Patent Literature

[PTL 1]
Japanese Patent Application Publication No. H5-103497

SUMMARY OF INVENTION

Technical Problem

However, the prior art includes the following problems.
When the torque of a multigroup, multiphase driving system is small, a proportion of a loss component (so-called carrier loss) corresponding to a switching frequency (a carrier frequency) of the power converter increases relative to an overall loss even in a case where the load equals or exceeds a fixed value. In the multigroup, multiphase driving system described in PTL 1, however, the effect of this carrier loss is not taken into account.

Further, to determine the number of groups to be used to drive the rotary electric machine in a multigroup, multiphase driving system, effects generated by the rotation speed and the torque must be taken into consideration in addition to the size of the load, but in the multigroup, multiphase driving system described in PTL 1, these effects are not taken into account.

Furthermore, in a multigroup, multiphase driving system, when variation occurs in a voltage of the direct current power supply or the carrier frequency, or when variation occurs in a field magnetic flux of the rotary electric machine, respective proportions of fundamental iron loss, fundamental wave copper loss, carrier loss, and so on vary relative to the overall loss, leading to variation in the effects obtained by modifying the number of groups used to drive the rotary electric machine, but in the multigroup, multiphase driving system described in PTL 1, these effects are not taken into account.

Therefore, in a case where a rotary electric machine is driven by a conventional multigroup, multiphase driving system after determining the number of groups to be used to drive the rotary electric machine, loss may increase when the number of used groups is switched, contrary to expectations.

Here, these effects are particularly striking in a system including a rotary electric machine that is required to output a wide range of rotation speeds and torques, such as a driving system for an electric vehicle, a hybrid vehicle, or the like, a system that uses a storage battery having a voltage that varies in accordance with a charging condition, such as a lithium ion battery or a nickel hydrogen battery, as a power supply, and a system that performs driving while varying the switching frequency of the power converter in order to reduce the overall loss of the driving system, and are also particularly striking when a temperature of the driving system varies over a wide range.

This invention has been designed to solve the problems described above, and an object thereof is to obtain a multigroup, multiphase driving system and a driving method for a rotary electric machine, with which an overall loss of the system can be greatly reduced.

Solution to Problem

A multigroup, multiphase driving system according to this invention includes a power converter that converts direct current power into alternating current power and vice versa, a direct current power supply connected to a direct current side of the power converter so as to be charged with and discharge direct current power, and a rotary electric machine that is connected to an alternating current side of the power converter and includes a plurality of groups of multiphase armature windings, and further includes a determination unit that determines a number of groups to be used to drive the rotary electric machine on the basis of a rotation speed of the rotary electric machine, a current flowing through the rotary electric machine, a direct current power supply voltage of the direct current power supply, and a carrier frequency of the power converter.

Advantageous Effects of Invention

In the multigroup, multiphase driving system according to this invention, the determination unit determines the number of groups to be used to drive the rotary electric machine on the basis of the rotation speed of the rotary electric machine, the current flowing through the rotary electric machine, the direct current power supply voltage of the direct current power supply, and the carrier frequency of the power converter.

Therefore, the number of groups to be used can be determined appropriately even when driving conditions or a driving environment varies greatly.

As a result, the overall loss of the system can be greatly reduced.

DESCRIPTION OF EMBODIMENTS

Preferred embodiments of a multigroup, multiphase driving system and a driving method for a rotary electric machine according to this invention will be described below using the drawings. Identical or corresponding parts of the drawings will be described using identical reference numerals.

First Embodiment

Figure 1:
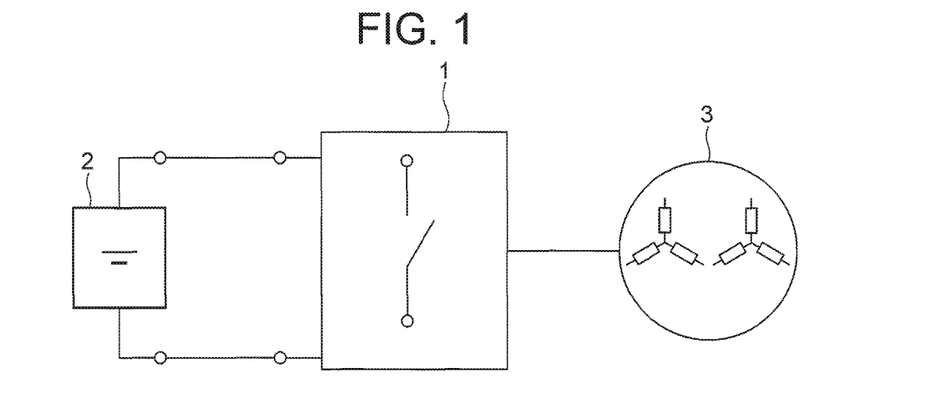
FIG. 1 is a schematic view showing a configuration of a multigroup, multiphase driving system according to a first embodiment of this invention.

FIG. 1 is a schematic view showing a configuration of a multigroup, multiphase driving system according to a first embodiment of this invention. In the multigroup, multiphase driving system shown in FIG. 1, a battery (a direct current power supply) 2 that is charged with and discharges direct current power is connected to a direct current side of an inverter (a power converter) 1 that converts direct current power into alternating current power and vice versa, and a motor (a rotary electric machine) 3 that converts alternating current power into mechanical energy and vice versa is connected to an alternating current side of the inverter 1.

Figure 2:
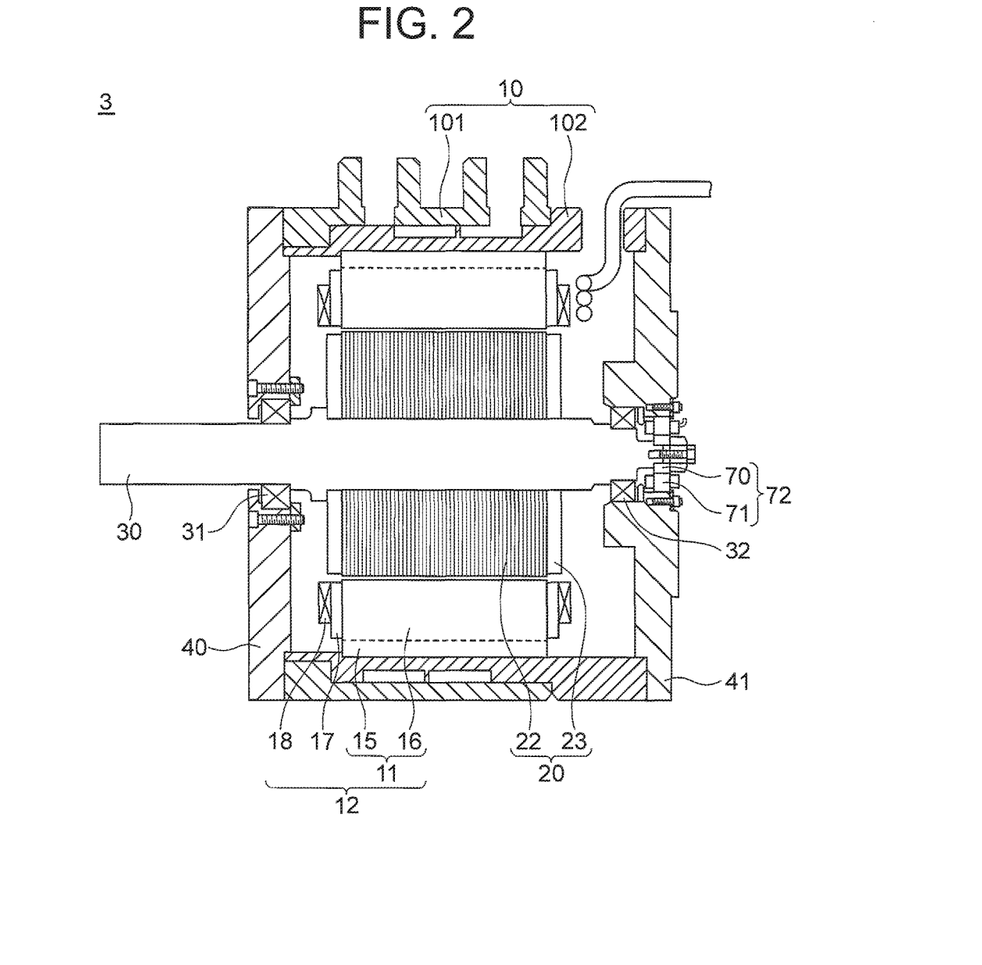
FIG. 2 is an axial direction sectional view showing a rotary electric machine provided in the multigroup, multiphase driving system according to the first embodiment of this invention.
Figure 3:
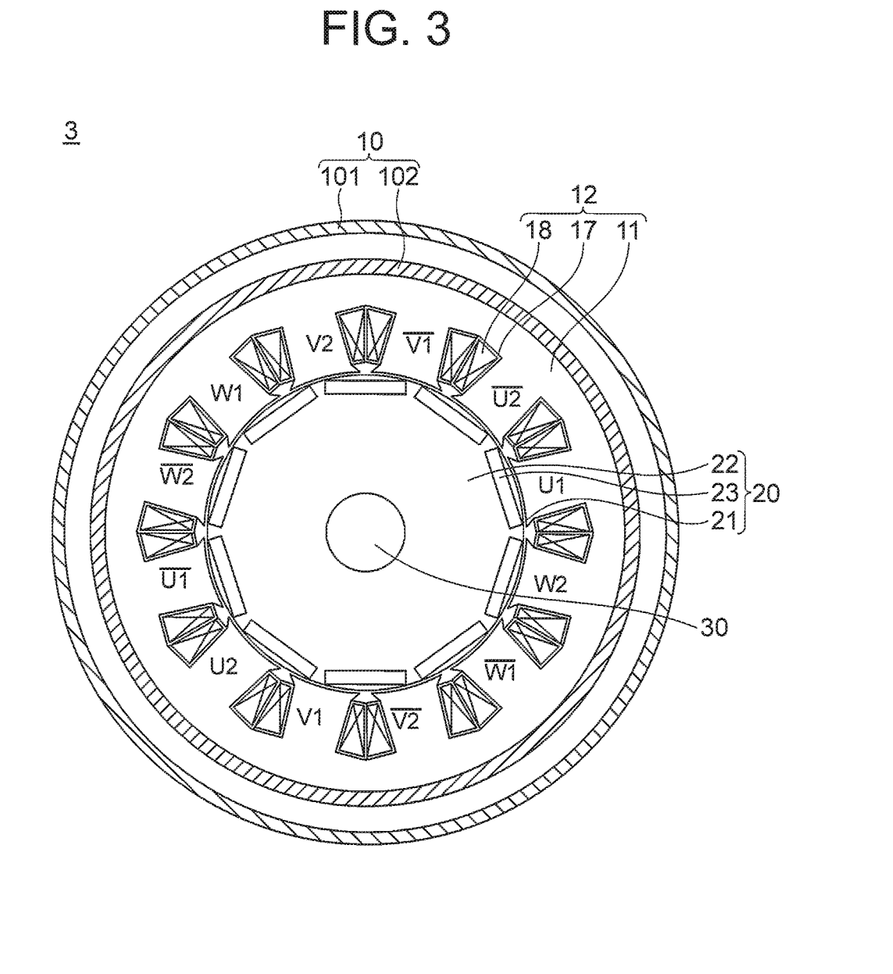
FIG. 3 is a radial direction sectional view showing the rotary electric machine provided in the multigroup, multiphase driving system according to the first embodiment of this invention.

FIG. 2 is an axial direction sectional view showing the motor 3 provided in the multigroup, multiphase driving system according to the first embodiment of this invention, and FIG. 3 is a radial direction sectional view showing the motor 3 provided in the multigroup, multiphase driving system according to the first embodiment of this invention.

In FIGS. 2 and 3, the motor 3 is constituted by a cylindrical frame 10 formed from an outer frame base 101 and an inner frame 102, a stator 12 housed in the frame 10, a rotor 20 disposed on an inner periphery of the stator 12, a shaft 30 attached to an inner diameter of the rotor 20, a load side bearing 31, an anti-load side bearing 32, a disc-shaped load side bracket 40, and a disc-shaped anti-load side bracket 41.

The stator 12 is constituted by a stator core 11 in which twelve teeth 16 project toward an inner diameter side from an annular yoke portion 15, and coils 18 formed by winding a conductor a plurality of times around each tooth 16 via an insulating material 17. The coils 18 are divided into first group coils and second group coils that are arranged alternately in a circumferential direction, and are respectively connected in a three-phase Y connection. Further, the stator core 11 is manufactured by laminating thin steel plates, for example.

The rotor 20 is constituted by a rotor core 22 in which ten magnet insertion holes 21 are formed in the circumferential direction, and permanent magnets 23 inserted into the respective magnet insertion holes 21 such that N poles and S poles are alternately oriented toward an outer side. Further, the rotor core 22 is manufactured by laminating thin steel plates, for example. Furthermore, the permanent magnets 23 may be neodymium sintered magnets, samarium-cobalt magnets, ferrite magnets, and so on. Hence, the motor 3 is constituted by a two-group, three-phase concentrated winding motor having ten poles and twelve slots.

The load side bearing 31 and the anti-load side bearing 32 support respective ends of the shaft 30 to be free to rotate. The load side bracket 40 and the anti-load side bracket 41 respectively hold the load side bearing 31 and the anti-load side bearing 32, and respective outer peripheral sides thereof are attached to the frame 10.

Here, a resolver rotor 70 is attached to an anti-load side end portion of the shaft 30, and a resolver stator 71 is attached to the anti-load side bracket 41 in a position opposing the resolver rotor 70. Hence, a rotation position and a rotation speed of the motor 3 are monitored by a resolver 72 constituted by the resolver rotor 70 and the resolver stator 71.

Although not shown in the drawings, thermistors (coil temperature detection units) are attached respectively to the first group coils and second group coils of the coils 18 in order to monitor the temperatures of the coils 18. A thermistor is also provided in the axial direction vicinity of the rotor 20, and temperatures of the permanent magnets 23 are estimated on the basis of the temperature monitored by this thermistor.

Note that although the temperatures of the coils 18 are measured using thermistors, the temperatures of the coils 18 may be measured using thermocouples. Further, although the temperatures of the permanent magnets 23 are estimated on the basis of the temperature measured by the thermistor provided in the axial direction vicinity of the rotor 20, the temperatures of the permanent magnets 23 may be estimated on the basis of a temperature measured using a thermocouple.

At this time, the temperature used to estimate the temperatures of the permanent magnets 23 may be a temperature obtained in a different location as long as this location is a site within the motor 3 having a high correlation to the temperatures of the permanent magnets 23. Moreover, temperatures obtained in a plurality of locations may be used. Similar effects can be obtained with these configurations. Note that the temperatures of the permanent magnets 23 may be measured directly using slip rings or the like. In so doing, the temperatures of the permanent magnets 23 can be monitored more accurately.

Figure 4:
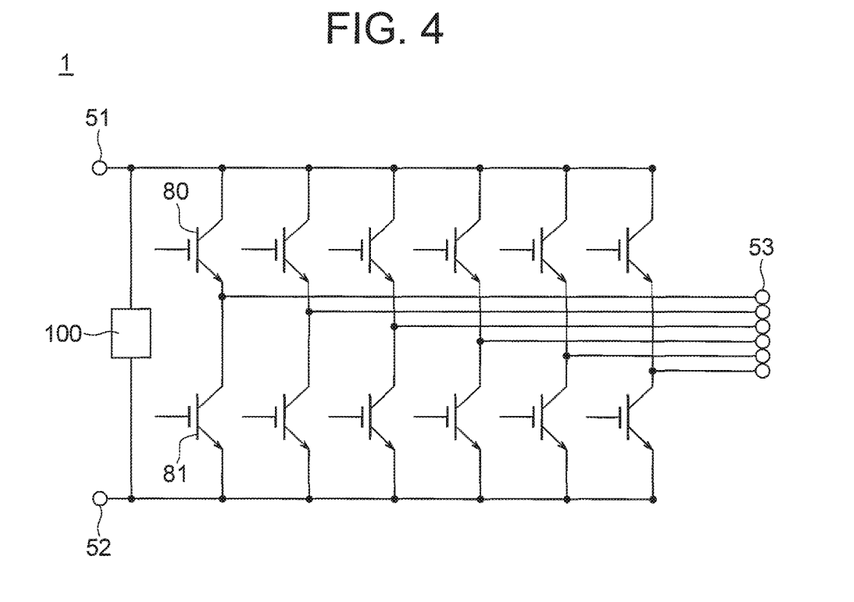
FIG. 4 is a circuit diagram showing a power converter provided in the multigroup, multiphase driving system according to the first embodiment of this invention.

FIG. 4 is a circuit diagram showing the inverter 1 provided in the multigroup, multiphase driving system according to the first embodiment of this invention. In the inverter 1 shown in FIG. 4, a circuit for a single phase is formed by inserting an upper arm side transistor 80 between a battery 2 side positive electrode terminal 51 and a motor 3 side alternating current terminal 53, and inserting a lower arm side transistor 81 between the alternating current terminal 53 and a battery 2 side negative electrode terminal 52, and circuits for a total of six phases are built into the inverter 1.

Further, the alternating current terminals 53 of the respective phases are connected to six lead-out terminals (not shown) of the motor 3 such that two sets of three-phase power having a phase deviation of 30 degrees are exchanged between the inverter 1 and the motor 3. Although not shown in the drawings, diodes are connected in parallel to the respective transistors 80, 81.

Here, the transistors 80, 81 are formed using silicon IGBTs, for example, but depending on the voltages to be employed, FETs may be used instead. Wide bandgap semiconductors such as silicon carbide and gallium nitride may also be used. Similar effects can be obtained regardless of the type of transistor.

Furthermore, a voltage sensor 100 is connected between the positive electrode terminal 51 and the negative electrode terminal 52 of the inverter 1 in order to monitor a voltage of the direct current power supplied by the battery 2. Moreover, current sensors (not shown) are connected between the alternating current terminals 53 of the respective phases and the lead-out terminals of the motor 3 in order to monitor amplitudes and phases of currents supplied to the respective phases. Note that the current sensors may be built into the inverter 1 or the motor 3.

Figure 5:
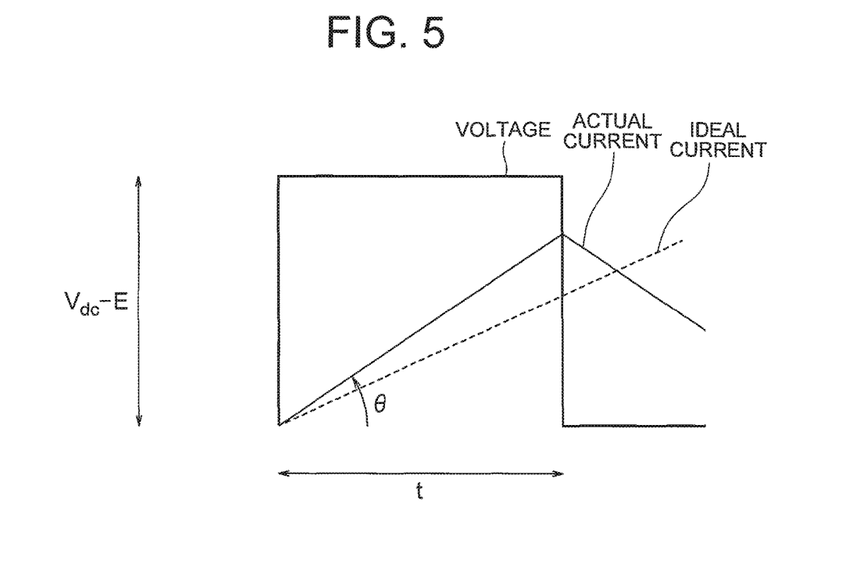
FIG. 5 is an illustrative view showing a relationship between a voltage applied to the rotary electric machine and a current flowing through the rotary electric machine in the multigroup, multiphase driving system according to the first embodiment of this invention.

Next, referring to FIG. 5, an operation of the multigroup, multiphase driving system according to the first embodiment of this invention will be described. FIG. 5 is an illustrative view showing a relationship between a voltage applied to the motor 3 and a current flowing through the motor 3 in the multigroup, multiphase driving system according to the first embodiment of this invention.

When the motor 3 is driven at a high torque, driving is performed using both groups of windings, i.e. the first group coils and the second group coils. When the motor 3 is driven at a low torque, on the other hand, the inverter 1 refers to the direct current power supply voltage of the battery 2, the rotation speed of the motor 3, the alternating current supplied to the motor 3, and a carrier frequency of the inverter 1, and on the basis of these values, determines from a map prepared in advance whether to drive the motor 3 using only one group, among the first group coils and the second group coils, or to drive the motor 3 using both groups.

Here, when driving is performed using either the first group coils or the second group coils, the group in which the temperatures of the coils 18 are lower, among the first group coils and the second group coils, is used to drive the motor 3. Further, the group to be used is determined at fixed time intervals during single group driving, and the group in which the temperatures of the coils 18 are lower is used to drive the motor 3.

Next, loss occurring in the motor 3 during low torque driving will be described. The loss can be broadly divided into copper loss generated when the coils 18 are energized, iron loss generated by magnetic flux variation between the rotor core 22 and the stator core 11, mechanical loss including friction generated by the load side bearing 31 and the anti-load side bearing 32 when the rotor 20 rotates, windage loss generated in the motor 3, and so on, and magnet loss caused by eddy currents generated in the permanent magnets 23 of the rotor 20.

Of these types of loss, mechanical loss is considerably smaller than the other types of loss, and can therefore be ignored. Further, during low torque driving, the current applied to the motor 3 is small, and therefore copper loss is small. Moreover, the eddy currents that lead to magnet loss are unlikely to be generated, and therefore magnet loss is also small. Hence, during low torque driving, iron loss is the dominant type of loss.

Next, iron loss occurring in the motor 3 in a driving system from which a wide torque speed characteristic is required, such as a driving system for an electric vehicle, will be described in detail. The iron loss includes fundamental iron loss, which is generated when a sinusoidal current is applied to the coils 18, and carrier iron loss (carrier loss), which is an increase from the fundamental iron loss that is generated when a pseudo-sinusoidal current obtained by applying a chopped direct current voltage is applied using the inverter 1.

The carrier iron loss is generated when the chopped direct current voltage is applied such that the current flowing through the coils 18 momentarily jumps, and therefore, when an inductance of the motor 3 is larger than the direct current power supply voltage, substantially no carrier iron loss is generated. In a motor having a wide torque speed characteristic, however, it is necessary to design the inductance to be small, and in this type of motor, the carrier iron loss is typically large. When the torque of the motor 3 is small, the proportion of the carrier iron loss relative to the overall loss is particularly large, and may make up approximately half of the overall loss.

Further, in addition to magnetic flux variation caused by the sinusoidal current flowing through the coils 18, the fundamental iron loss includes a harmonic wave generated when the magnetic flux created by the permanent magnets 23 of the rotor 20 does not form a perfectly sinusoidal wave, a harmonic wave due to the shapes of the rotor 20 and the stator 12, and so on.

Here, the iron loss substantially conforms to the Steinmetz empirical formula, and is therefore expressed as shown below in Equation (1).

[Math. 1]

$$W = \alpha B^{1.6} f + \beta B^2 f^2 \qquad (1)$$

In Equation (1), W denotes the iron loss, $\alpha$ denotes a coefficient of hysteresis loss, B denotes a magnetic flux density, f denotes a frequency of the magnetic flux variation, and $\beta$ denotes a coefficient of eddy current loss. Meanwhile, the magnetic flux in the motor 3 is expressed as shown below in Equation (2).

[Math. 2]

$$\phi = \sqrt{\phi_d^2 + \phi_q^2} = \sqrt{(L_d i_d + \phi_{mag})^2 + (L_q i_q)^2} \qquad (2)$$

In Equation (2), $\phi$ denotes the magnetic flux, which, using a magnetic permeability $\mu$, has a relationship of $\phi = \mu B$ with the magnetic flux density B. Further, in Equation (2), L denotes the inductance, i denotes the current, $\phi_{mag}$ denotes the magnetic flux created by the permanent magnets 23, and the affixes d, q respectively denote a central axis (a vertical axis) of a magnetic pole of the rotor 20 and a magnetically orthogonal axis (a horizontal axis) thereto.

As is evident from Equations (1) and (2), the magnitude of the magnetic flux φ is greatly affected by the magnitude of the iron loss. Further, as described above, when the inductance of the motor 3 is small and low torque driving is underway, the current applied to the motor 3 is also small, and in this case, therefore, the terms $L_d i_d$ and $L_q i_q$ are negligible in comparison with magnet flux. As a result, magnet flux is the dominant type of magnetic flux.

Hence, during low torque driving, the dominant type of iron loss (so-called no-load iron loss) is iron loss caused by the magnet flux, which is determined by the type of the permanent magnets 23 and so on. During low torque driving, therefore, the fundamental iron loss exhibits substantially no variation even in response to slight variation in the applied current.

Furthermore, the carrier iron loss, as described above, is generated in response to a current ripple that occurs when a chopped voltage is applied on the basis of PWM driving. When a voltage application time t is sufficiently shorter than an electrical time constant of the motor 3, as shown in FIG. 5, this may be considered in terms of a simple model in which the current rises in a straight line in response to voltage application. Note that a single voltage application period of the inverter is typically sufficiently smaller than the electrical time constant of the motor.

Here, an amplitude $i_c$ of the carrier current ripple has a relationship shown below in Equation (3) relative to the voltage application time t and a current incline θ.

[Math. 3]

$$i_c = t \tan \theta \qquad (3)$$

In Equation (3), the voltage application time t is commensurate with an inverse of a carrier frequency $f_c$ and commensurate with a modulation factor m, as shown below in Equation (4). Further, tan θ is expressed as shown below in Equation (5).

[Math. 4]

$$t \propto \frac{m}{f_c} \qquad (4)$$

[Math. 5]

$$\tan\theta \propto \frac{(V_{dc} - E)R}{L} \qquad (5)$$

In Equation (5), $V_{dc}$ denotes the direct current power supply voltage, E denotes a terminal voltage of the motor 3, R denotes a coil resistance of the motor 3, and L denotes the inductance of the motor 3. Further, the modulation factor m shown in Equation (4) is expressed as shown below in Equation (6).

[Math. 6]

$$m = \frac{\omega\phi}{V_{dc}\varepsilon} \qquad (6)$$

In Equation (6), ω denotes an electric angular velocity, and ε denotes a voltage use rate. From the above, the amplitude $i_c$ of the carrier current ripple is expressed as shown below in Equation (7).

[Math. 7]

$$i_c \propto \frac{1}{f_c} \frac{\omega\phi}{V_{dc}\varepsilon} \frac{(V_{dc} - E)R}{L} \qquad (7)$$

In Equation (7), the carrier frequency $f_c$, the inductance L, and the coil resistance R are known quantities. When the direct current power supply voltage $V_{dc}$, the electric angular velocity ω, and a current $i_d i_q$ are known from Equations (2) and (7), the amplitude $i_c$ of the carrier current ripple is known, and therefore the carrier iron loss can be estimated. Further, the terminal voltage E of the motor 3 can be determined when the driving condition is known.

Here, the direct current power supply voltage $V_{dc}$ varies according to the charging condition of the battery 2, but may be considered as a constant at a certain moment. The electric angular velocity ω likewise takes a unique value at a certain rotation speed. At this time, the amplitude $i_c$ of the carrier current ripple is determined from Equations (2) and (7) in accordance with the magnetic flux φ, but as described above, during low torque driving, the magnetic flux φ is governed by the magnetic flux $\phi_{mag}$ created by the permanent magnets 23, and therefore the amplitude $i_c$ of the carrier current ripple exhibits substantially no variation even in response to slight variation in the current value.

In consideration of the above, effects obtained by an operation of the multigroup, multiphase driving system according to the first embodiment of this invention will be described. First, a current applied to the coils 18 of a single group in order to output an identical torque when driving is performed using a single group during low torque driving is approximately double the current applied to the coils 18 when driving is performed using both groups. At this time, as described above, the fundamental iron loss is governed by the magnet flux, and therefore exhibits substantially no variation.

Meanwhile, in an identical environment (i.e. when driving is performed using a single group during low torque driving), the amplitude $i_c$ of the carrier current ripple, which is related to the carrier iron loss, remains equal to the amplitude generated during driving performed using both groups even when the current increases. At this time, the number of driven coils 18 is halved, and therefore the iron loss generated by the teeth 16 is half the iron loss generated when driving is performed using both groups.

Furthermore, magnetic flux variation is conventionally generated in the yoke portion 15 in response to a carrier current ripple excited by the coils 18 of the two groups, but when driving is performed using a single group, the magnetic flux variation is halved. In other words, when driving is performed using a single group rather than two groups, of the two types of loss that are dominant during low torque driving, fundamental iron loss exhibits no variation, and carrier iron loss can be halved. As a result, an improvement in efficiency can be achieved during low torque driving.

Figure 6:
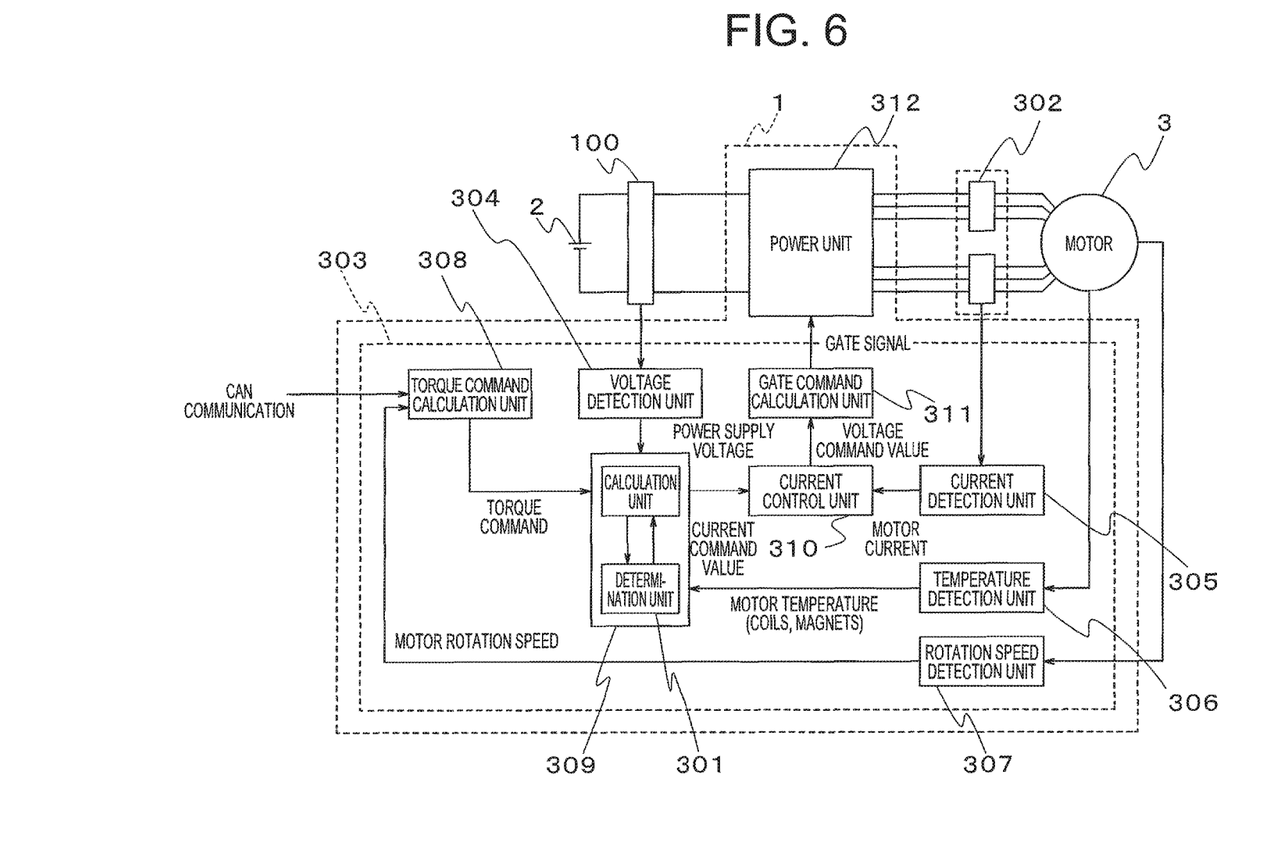
FIG. 6 is a block diagram showing a hardware configuration of group number control executed by the multigroup, multiphase driving system according to the first embodiment of this invention.

Here, as shown in FIG. 6, the number of groups to be used to drive the motor 3 is determined by a determination unit 301 built into the inverter 1. Signals from the voltage sensor 100, the current sensor 302, the resolver 72, and the thermistors are input into the determination unit 301 in order to provide the determination unit 301 with information indicating the direct current power supply voltage, the current, the rotation speed, and the coil temperatures, respectively. Note that information indicating the coil resistance, the magnet flux, and the carrier frequency is already known.

Further, the determination unit 301 determines the optimum number of groups to be used to drive the motor 3 by referring to a group number map that is stored in advance in the determination unit 301 and lists numbers of groups to be used in relation to the direct current power supply voltage, the current, the rotation speed, the coil resistance, the magnet flux, and the carrier frequency. At this time, the determination unit 301 sets the group having the lowest coil temperatures as the group to be used on the basis of the information indicating the coil temperatures.

A method employed in the multigroup, multiphase driving system according to the first embodiment of this invention to determine the number of groups to be used will now be described with reference to FIG. 6. In FIG. 6, a control unit 303 built into the inverter 1 includes a voltage detection unit 304 that detects the power supply voltage by receiving a signal from the voltage sensor 100. Further, the control unit 303 includes a current detection unit 305 that detects the value of the current flowing between the inverter 1 and the motor 3 by receiving a signal from the current sensor 302.

Furthermore, the control unit 303 includes a temperature detection unit 306 that detects, or estimates, the coil temperatures and the magnet temperatures of the motor 3 by receiving signals from the thermistors attached to the motor 3. The control unit 303 also includes a rotation detection unit 307 that detects the rotation speed of the motor 3 by receiving a signal from the resolver 72.

A torque command calculation unit 308 receives information indicating an accelerator opening and so on by CAN communication, and determines a torque command in accordance with the motor rotation speed detected by the rotation speed detection unit 307.

A current command calculation unit 309 receives the torque command, output by the torque command calculation unit 308, and the motor rotation speed, generates a current command value using the power supply voltage received from the voltage detection unit 304, the coil temperatures and magnet temperatures of the motor 3, received from the temperature detection unit 306, and the known carrier frequency, determines the number of groups and the groups to be used by referring to the group number map using the determination unit 301, which is built into the current command calculation unit 309, and determines final current command values for the respective groups and phases.

A current control unit 310 generates a voltage command value from the current command values output by the current command calculation unit 309 and the value of the current flowing between the inverter 1 the motor 3, detected by the current detection unit 305, and outputs the generated voltage command value to a gate command calculation unit 311. The gate command calculation unit 311 generates a gate signal from the voltage command value output by the current control unit 310, and inputs the generated gate signal into gates of respective power transistors of a power unit 312.

Here, the group number map used by the determination unit 301 is affected by the power supply voltage, the carrier frequency, the torque (or the current command value), the temperature, the rotation speed, and so on, and therefore has a complicated and cumbersome configuration when a conventional method is used.

With the method of this invention, on the other hand, the carrier current amplitude is not affected by the phase current, as shown in Equation (7), and as long as the magnetic flux created by the current is sufficiently smaller than the magnetic flux created by the magnets in Equation (2), the phase current may also be considered to have substantially no effect on the fundamental iron loss. Therefore, in a region where driving is performed using a limited number of groups, an amount by which the carrier iron loss decreases when driving using both groups is switched to driving using a single group is larger than an amount by which loss generated in an energized conductor, or in other words conductor loss, increases.

Figure 7:
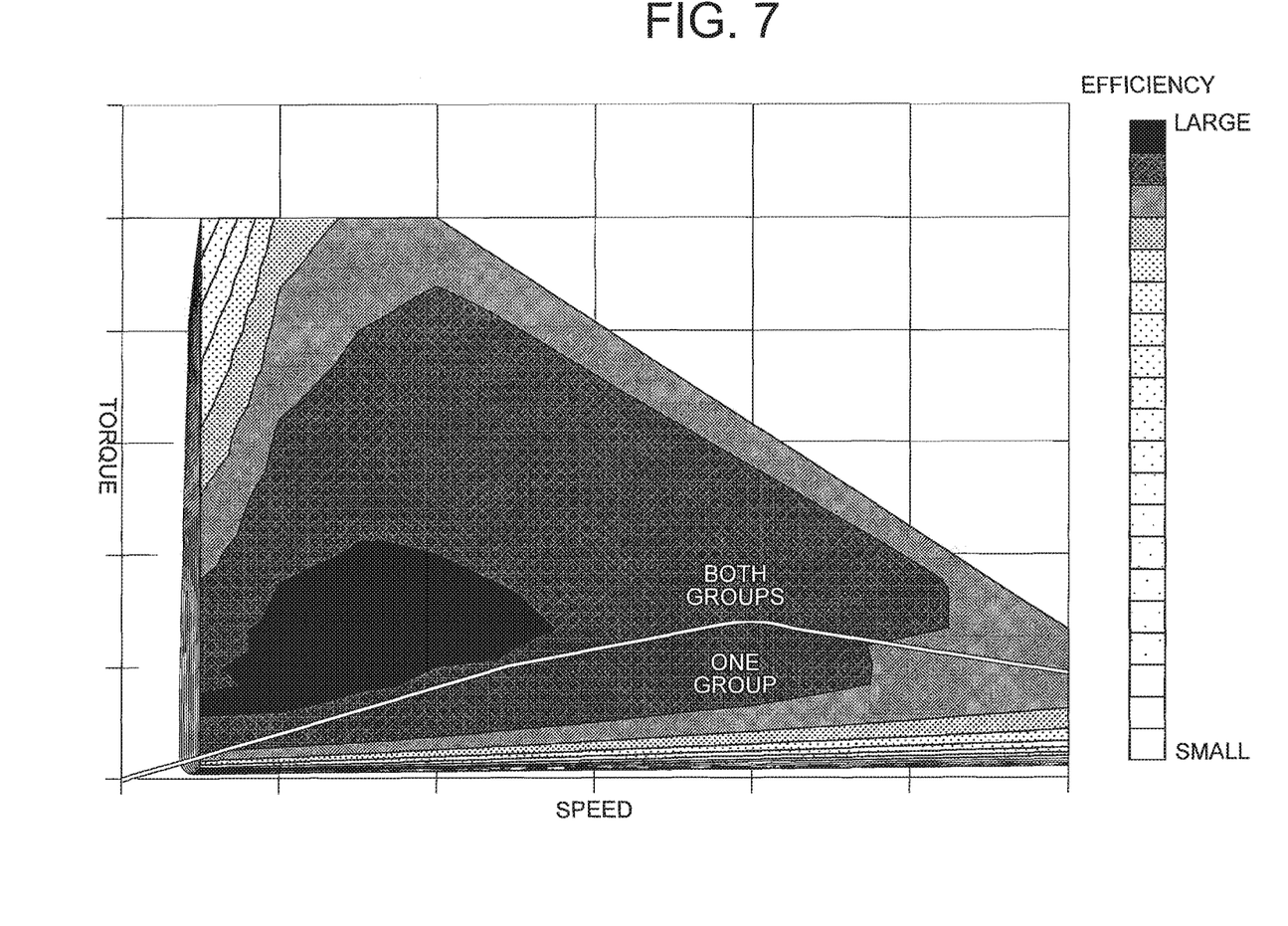
FIG. 7 is an illustrative view showing a region in which driving is performed using one group and a region in which driving is performed using both groups in the multigroup, multiphase driving system according to the first embodiment of this invention.

Hence, the region where driving is performed using a limited number of groups may be considered as a region where the torque is smaller than the torque in a region where the amount by which the carrier iron loss decreases is equal to the amount by which the conductor loss increases. Further, by creating the group number map in this manner, control can be simplified. With this configuration, a region in which driving is performed using a single group and a region in which driving is performed using both groups can be determined as shown in FIG. 7, for example.

Therefore, by having the determination unit 301 determine the optimum number of groups to be used to drive the motor 3 on the basis of the direct current power supply voltage, the current, the rotation speed, and the carrier frequency in this manner, a particularly large efficiency improvement effect can be obtained in an application such as an electric vehicle, in which a low torque driving region is used frequently under normal conditions.

Furthermore, the direct current power supply voltage, the rotation speed, and the current are monitored using sensors, and therefore, when the direct current power supply voltage varies due to variation in the charging condition of the battery 2 or the like, or when the rotation speed or the torque varies, the determination as to whether to perform driving using a single group or both groups can be made taking this variation into account. As a result, a reduction in efficiency when the number of used groups is switched can be prevented from occurring, and the determination as to whether to perform driving using a single group or both groups can be made over an entire range in which an effect is obtained.

Moreover, by referring to the carrier frequency of the inverter 1, the determination as to whether to perform driving using a single group or both groups can be made accurately likewise in a driving system having a variable carrier frequency. Further, by monitoring the coil temperatures of the coils 18, the coil resistance can be learned accurately, and as a result, the determination as to whether to perform driving using a single group or both groups can be made over the entire range in which an effect is obtained. Further, by estimating the temperatures of the permanent magnets 23, the magnet flux can be learned accurately, and as a result, the determination as to whether to perform driving using a single group or both groups can be made over the entire range in which an effect is obtained.

Furthermore, by monitoring the respective temperatures of the first group coils and second group coils of the coils 18, the group having the lower coil temperatures can be used during single group driving, and therefore a temperature increase can be suppressed, enabling a reduction in copper loss. As a result, an improvement in efficiency can be achieved. Further, the group to be used is determined at fixed time intervals during single group driving, enabling a further reduction in copper loss.

Furthermore, the determination unit 301 monitors the temperatures of the magnets 23 in order to estimate the magnet flux generated by the magnets 23, or in other words the field magnetic flux, and therefore the operating region in which loss can be reduced by performing single group driving can be calculated with an even higher degree of precision.

Note that although the determination unit 301 uses the current value measured by the current sensor to determine the number of groups to be used to drive the motor 3, this invention is not limited thereto, and instead, the determination unit 301 may use a command current plotted on a map in relation to a command torque. Similar effects can be obtained with this configuration.

Further, the determination unit 301 may hold maps relating to all of the direct current power supply voltage, the current, the rotation speed, the coil temperatures, the magnet flux, and the carrier frequency, or may correct the direct current power supply voltage, the coil temperatures, the magnet flux, and the carrier frequency using a correction formula or the like. With this configuration, the amount of data that must be held by the determination unit 301 can be reduced, enabling a reduction in apparatus size. Furthermore, the determination unit 301 may be built into the inverter 1 or disposed separately on the outside of the inverter 1.

According to the first embodiment, as described above, the determination unit 301 determines the number of groups to be used to drive the rotary electric machine on the basis of the rotation speed of the rotary electric machine, the current flowing through the rotary electric machine, the direct current power supply voltage of the direct current power supply, and the carrier frequency of the power converter.

In so doing, the number of groups to be used can be determined appropriately even when the driving condition or driving environment varies greatly.

As a result, overall loss in the system can be greatly reduced.

Note that in the first embodiment, the current command calculation unit 309 generates the current command value from the torque command and determines the number of groups and the groups using the determination unit 301, but the current command calculation unit 309 may determine the number of groups and the groups using the torque command directly instead of converting the torque command into a current command value. Similar effects are obtained with this configuration.

Further, in the first embodiment, the determination unit 301 determines the number of groups to be used and the groups to be used, but may simultaneously determine current command values to be applied to the respective groups. Similar effects are obtained with this configuration.

Second Embodiment

Figure 8:
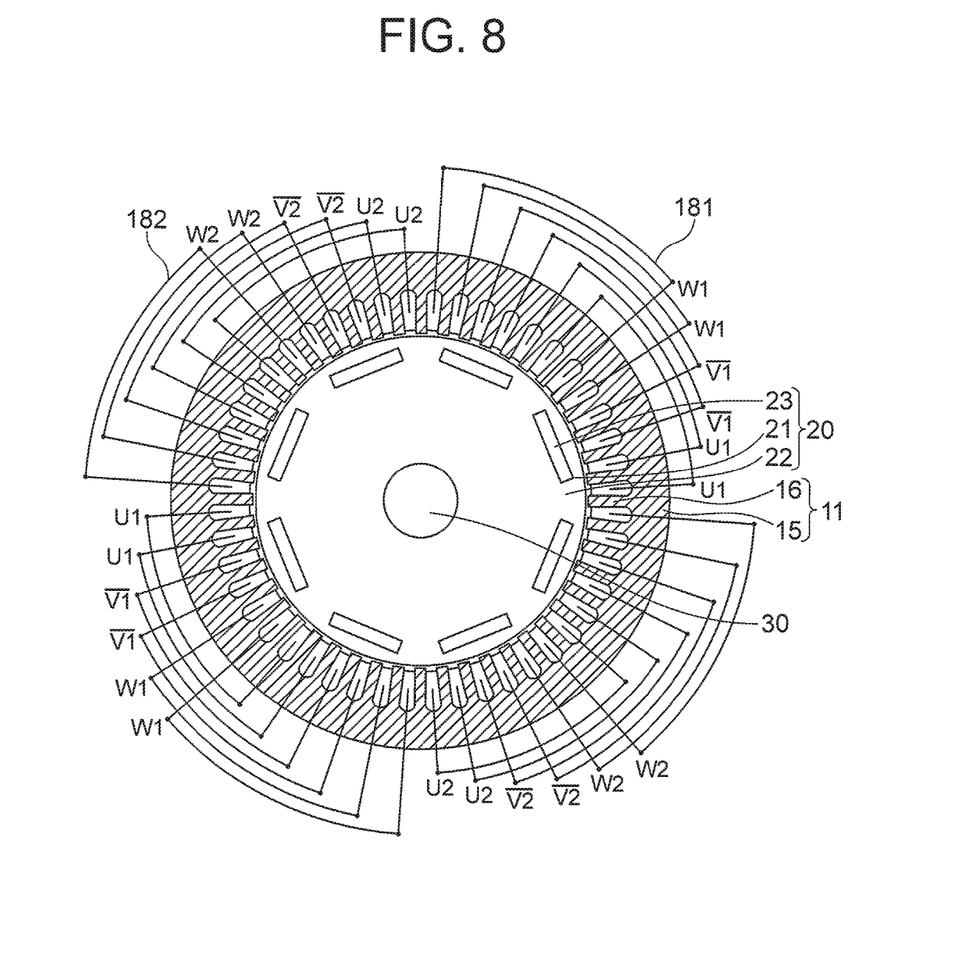
FIG. 8 is a radial direction sectional view showing a rotary electric machine provided in a multigroup, multiphase driving system according to a second embodiment of this invention.

FIG. 8 is a radial direction sectional view showing the motor 3 provided in a multigroup, multiphase driving system according to a second embodiment of this invention. In FIG. 8, the stator 12 of the motor 3 includes forty-eight teeth 16, and the coils 18 are inserted in positions extending over six slots from a slot at one end.

As a result, the first group coils 181 are formed using the coils of twelve slots, the second group coils 182 are formed using the coils of the twelve slots that are adjacent thereto in the circumferential direction, a further set of first group coils is formed adjacent thereto, and a further set of second group coils is formed adjacent thereto.

In the rotor 20, the permanent magnets 23 are inserted into the eight permanent magnet holes 21 formed in the circumferential direction such that N poles and S poles are alternately oriented toward the outer side. Hence, the motor 3 is constituted by a two-group, three-phase, full-pitch distributed winding motor having eight poles and forty-eight slots.

In this multigroup, multiphase driving system, the determination unit 301 determines the optimum number of groups to be used to drive the motor 3, the amplitude and the phase of the current, and the carrier frequency by referring to a command value map on which the number of groups to be used, the amplitude and phase of the current to be supplied, and the carrier frequency are listed in accordance with the rotation speed, the torque, the direct current power supply voltage, and the coil temperature from the rotation speed, the direct current power supply voltage, and the coil temperature, which are obtained from the respective sensors with respect to the torque command value, and the torque command value to be used.

At this time, the inverter 1 supplies alternating current power to the motor 3 at a current amplitude, a current phase, and a carrier frequency determined for a predetermined number of groups. Note that all other configurations are identical to the first embodiment, and therefore description thereof has been omitted.

According to this configuration, the first group coils 181 and the second group coils 182 are respectively wound around different teeth rather than being wound around the same teeth. In other words, the coils are wound such that the magnetic flux created thereby is not shared by identical teeth. When single group driving is performed with this configuration, carrier iron loss can be reduced in the core around which the non-driven coils are wound, and as a result, a reduction in loss can be achieved.

Further, likewise with this configuration, similarly to the first embodiment, described above, the carrier iron loss can be halved, leading to an improvement in efficiency, by performing single group driving during low torque driving.

Third Embodiment

Figure 9:
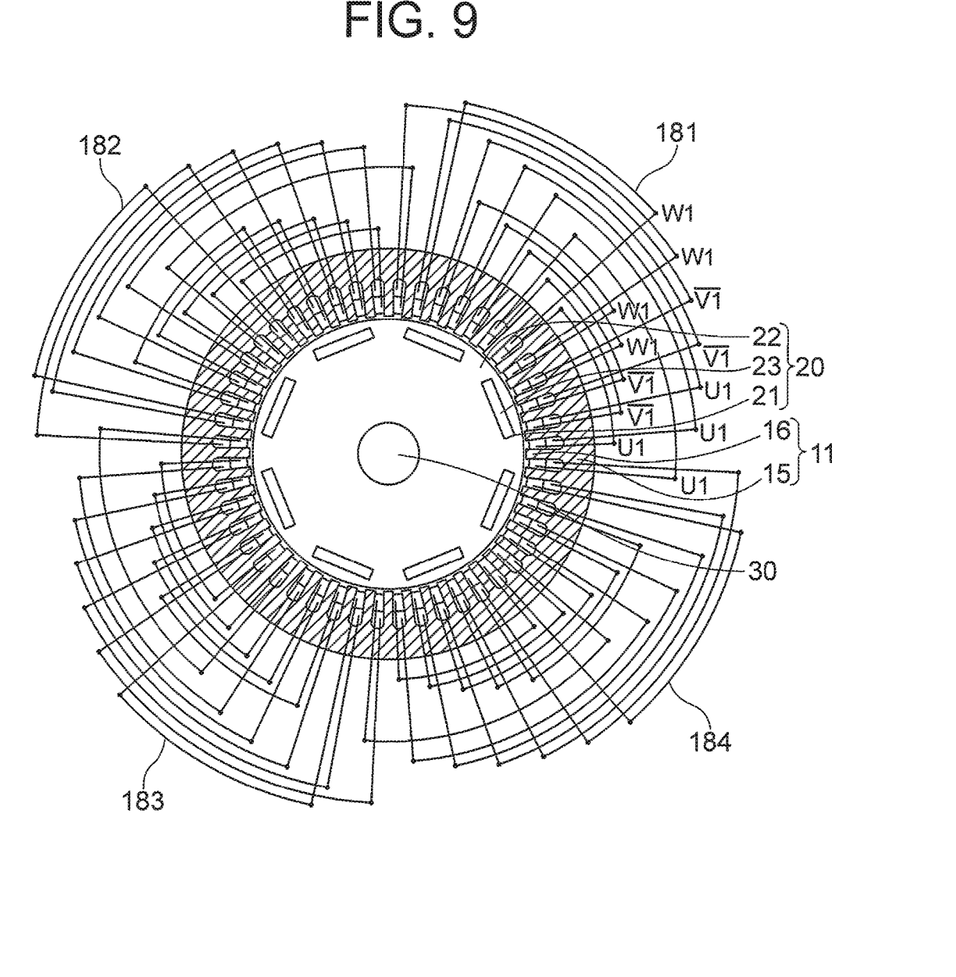
FIG. 9 is a radial direction sectional view showing a rotary electric machine provided in a multigroup, multiphase driving system according to a third embodiment of this invention.

FIG. 9 is a radial direction sectional view showing the motor 3 provided in a multigroup, multiphase driving system according to a third embodiment of this invention. In FIG. 9, the stator 12 of the motor 3 includes forty-eight teeth 16. Further, two types of windings are inserted into a single slot such that the coils 18 are divided into coils on an outer side of the slots and coils on an inner diameter side of the slots.

Here, the coils 18 inserted into the outer diameter side are disposed so as to be inserted into the inner diameter side of a fifth slot in a counterclockwise direction. Further, coils inserted into positions from a twelfth slot onward, counting from the first slot in which a single group of coils is inserted, are inserted into a seventh slot in a clockwise direction.

Hence, a single group of coils is wound across twelve slots. Further, one group of coils is constituted by twelve slots in the circumferential direction, and a total of four groups of coils (first group coils 181 to fourth group coils 184) are formed. Furthermore, in each group, the temperature of at least one coil is monitored by a thermistor.

Although not shown in the drawings, circuits for twelve phases are formed between the positive electrode terminal 51 and the negative electrode terminal 52 of the inverter 1 such that four sets of three-phase alternating current power are exchanged between the inverter 1 and the motor 3 using the respective circuits. Hence, the motor 3 is constituted by a four-group, three-phase, short-pitch distributed winding motor having eight poles and forty-eight slots, and the inverter 1 is constituted by a four-group, three-phase inverter.

In this multigroup, multiphase driving system, the determination unit 301 drives the motor 3 using some or all of the four groups of coils during low torque driving. Further, the determination unit 301 determines the number of groups to be used to drive the motor 3 by referring to a map stored in advance on the basis of the carrier frequency, the direct current power supply voltage, the rotation speed, the required torque, the temperatures of the coils 18, and the magnet temperatures.

When, at this time, driving is to be performed using only one group of coils, the determination unit 301 sets the group having the lowest coil temperatures of the respective groups as the group to be used. Further, when driving is to be performed using two groups of coils, the determination unit 301 sets the groups on either side of the group having the highest coil temperatures as the groups to be used. Furthermore, when driving is to be performed using three groups of coils, the determination unit 301 sets the three groups other than the group having the highest coil temperatures as the groups to be used. Note that all other configurations are identical to the first embodiment, and therefore description thereof has been omitted.

With this configuration, a core volume in which carrier iron loss is generated can be reduced during low torque driving, enabling a further improvement in efficiency. Moreover, an efficiency improvement effect can be obtained up to a higher torque by performing driving without using one or more of the groups.

Fourth Embodiment

Figure 10:
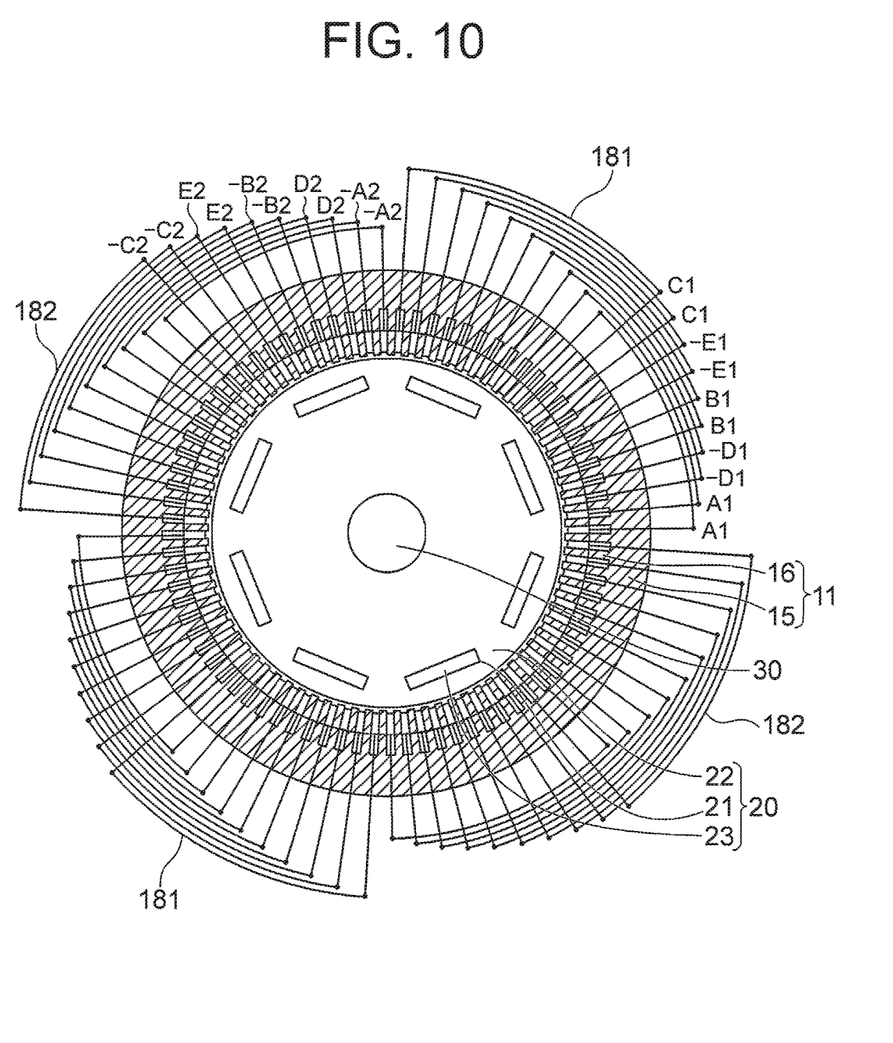
FIG. 10 is a radial direction sectional view showing a rotary electric machine provided in a multigroup, multiphase driving system according to a fourth embodiment of this invention.

FIG. 10 is a radial direction sectional view showing a rotary electric machine provided in a multigroup, multiphase driving system according to a fourth embodiment of this invention. In FIG. 10, the stator 12 of the motor 3 includes eighty teeth 16.

Further, one end of each coil 18 is inserted into a slot located ten slots in the counterclockwise direction away from a slot into which the other end of the same coil 18 is inserted, and windings are inserted into two slots for each phase in the counterclockwise direction in order of an A phase, a –D phase, a B phase, a –E phase, and a C phase. Here, the A phase, the B phase, the C phase, the D phase, and the E phase denote five-phase alternating current phases deviating from each other by 72 degrees. Note that the phases marked with the minus sign are phases having an opposite winding direction to the unmarked phases.

Furthermore, the first group coils 181, the second group coils 182, the first group coils 181, and the second group coils 182 are allocated to twenty slots each in the circumferential direction in that order, and connected in a Y connection.

Although not shown in the drawings, circuits for ten phases are formed between the positive electrode terminal 51 and the negative electrode terminal 52 of the inverter 1 such that two sets of five-phase alternating current power are exchanged between the inverter 1 and the motor 3 using the respective circuits. Hence, the motor 3 is constituted by a two-group, five-phase, full-pitch distributed winding motor having eight poles and eighty slots, and the inverter 1 is constituted by a two-group, five-phase inverter. Note that all other configurations are identical to the first embodiment, and therefore description thereof has been omitted.

With this configuration, a torque ripple can be reduced by increasing the number of phases. Moreover, similar effects to the first embodiment can be obtained by performing driving without using one or more of the groups.

Fifth Embodiment

Figure 11:
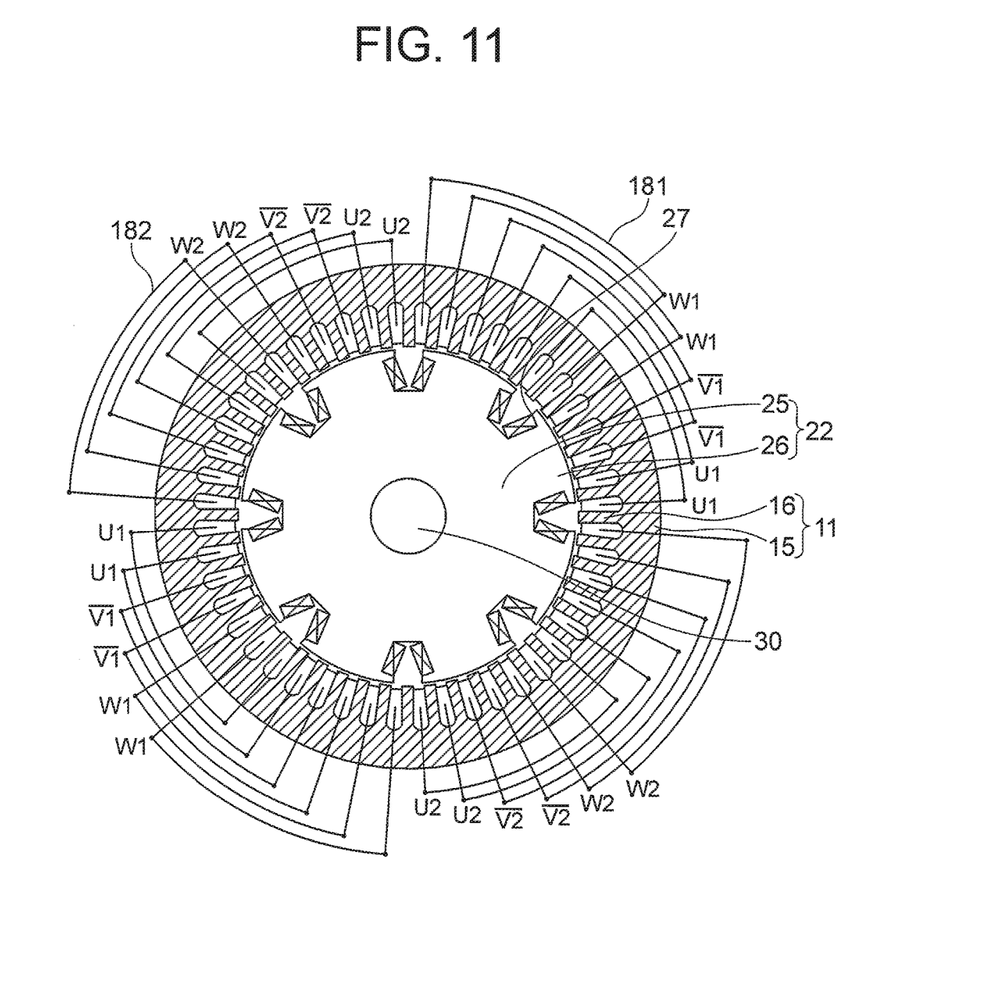
FIG. 11 is a radial direction sectional view showing a rotary electric machine provided in a multigroup, multiphase driving system according to a fifth embodiment of this invention.

FIG. 11 is a radial direction sectional view showing the motor 3 provided in a multigroup, multiphase driving system according to a fifth embodiment of this invention. In FIG. 11, the rotor 20 of the motor 3 is constituted by the rotor core 22, in which eight rotor core tooth portions 26 project toward the outer diameter side from an annular rotor core yoke portion 25, and field coils 27 formed by winding a conductor around each rotor core tooth portion 26.

The field coils 27 are wound in opposite winding directions alternately in the circumferential direction, and are connected successively in series in the circumference direction so as to be energized by a direct current supplied from an external power supply. As a result, the field coils 27 form eight field poles in the rotor 20 such that the motor 3 is constituted by a two-group, three-phase, full-pitch distributed winding motor having eight poles and forty-eight slots. Note that all other configurations are identical to the second embodiment, and therefore description thereof has been omitted.

Here, the current supplied to the field coils 27 is measured by a current sensor (not shown), and field magnetic flux generated by the field coils 27 is estimated from the current using a field magnetic flux map.

Likewise with this embodiment, similarly to the first embodiment, described above, the carrier iron loss can be halved, leading to an improvement in efficiency, by performing single group driving during low torque driving.

Furthermore, by estimating the field magnetic flux, it is possible to calculate the region in which the loss can be reduced with an even greater degree of precision.

Note that in the first to fifth embodiments, only the temperature of the motor 3 is monitored, but this invention is not limited thereto, and respective temperatures of the upper arm side transistor 80 and the lower arm side transistor 81 of the inverter 1 may also be monitored. At this time, a favorable effect can be obtained by reflecting the measured temperatures of the transistors (power modules) in the determination as to the group to be used preferentially.

More specifically, it is preferable to perform driving using a group in which the temperatures of the coils and the temperatures of the transistors are both low, but when the group having the lowest coil temperatures differs from the group having the lowest transistor temperatures, the group to be used may be determined using respective average values thereof. Note that this operation is applied not only during power running, but also during regeneration.

Further, in the embodiments described above, the determination unit 301 determines the number of groups to be used using the current command value or the torque command, but the number of groups may be determined using an actual current value detected by the current sensor 302. Similar effects can be obtained with this configuration.

The invention claimed is:
1. A multigroup, multiphase driving system comprising:
a power converter that converts direct current power into alternating current power and vice versa;
a direct current power supply connected to a direct current side of the power converter so as to be charged with and discharge direct current power;
a rotary electric machine that is connected to an alternating current side of the power converter and includes a plurality of groups of multiphase armature windings; and
a determination unit that determines a number of groups to be used to drive the rotary electric machine on the basis of a rotation speed of the rotary electric machine, a current flowing through the rotary electric machine, a direct current power supply voltage of the direct current power supply, and a carrier frequency of the power converter.

2. The multigroup, multiphase driving system according to claim 1, wherein the determination unit creates a group number map for determining the number of groups on the basis of the direct current power supply voltage of the direct current power supply and the carrier frequency of the power converter, refers to the group number map using the rotation speed of the rotary electric machine and the current flowing through the rotary electric machine, and determines a number of groups and a group with which to drive the rotary electric machine without using a part of the groups in a region having a smaller torque than the torque in a region where a reduction in carrier iron loss, which is generated in accordance with an amplitude of a carrier current ripple that is inversely proportionate to the carrier frequency, is equal to an increase in loss generated in an energized conductor forming coils of the armature windings of the rotary electric machine.

3. The multigroup, multiphase driving system according to claim 1, wherein the armature windings of the rotary electric machine are wound such that different groups do not share identical teeth in a stator core of the rotary electric machine.

4. The multigroup, multiphase driving system according to claim 2, wherein the armature windings of the rotary electric machine are wound such that different groups do not share identical teeth in a stator core of the rotary electric machine.

5. The multigroup, multiphase driving system according to claim 1, wherein the determination unit determines a current command value of the current flowing through the rotary electric machine.

6. The multigroup, multiphase driving system according to claim 2, wherein the determination unit determines a current command value of the current flowing through the rotary electric machine.

7. The multigroup, multiphase driving system according to claim 1, wherein armature windings of the rotary electric machine are wound as concentrated windings.

8. The multigroup, multiphase driving system according to claim 2, wherein armature windings of the rotary electric machine are wound as concentrated windings.

9. The multigroup, multiphase driving system according to claim 1, wherein armature windings of the rotary electric machine are wound as distributed windings.

10. The multigroup, multiphase driving system according to claim 2, wherein armature windings of the rotary electric machine are wound as distributed windings.

11. The multigroup, multiphase driving system according to claim 1, wherein the determination unit measures or estimates a field magnetic flux of the rotary electric machine, and takes the field magnetic flux into consideration when determining the number of groups to be used to drive the rotary electric machine.

12. The multigroup, multiphase driving system according to claim 2, wherein the determination unit measures or estimates a field magnetic flux of the rotary electric machine, and takes the field magnetic flux into consideration when determining the number of groups to be used to drive the rotary electric machine.

13. The multigroup, multiphase driving system according to claim 1, further comprising a coil temperature detection unit that measures or estimates a temperature of at least one coil in each group of armature windings of the rotary electric machine,
wherein the determination unit preferentially uses a group that includes windings having low temperatures.

14. The multigroup, multiphase driving system according to claim 2, further comprising a coil temperature detection unit that measures or estimates a temperature of at least one coil in each group of armature windings of the rotary electric machine,
wherein the determination unit preferentially uses a group that includes windings having low temperatures.

15. The multigroup, multiphase driving system according to claim 13, further comprising a power module temperature detection unit that measures or estimates a temperature of at least one power module of the power converter in each group,
wherein the determination unit preferentially uses a group in which respective average values of the coil temperatures and the power module temperatures are low.

16. The multigroup, multiphase driving system according to claim 14, further comprising a power module temperature detection unit that measures or estimates a temperature of at least one power module of the power converter in each group,
wherein the determination unit preferentially uses a group in which respective average values of the coil temperatures and the power module temperatures are low.

17. A driving method for a rotary electric machine, executed in a multigroup, multiphase driving system including:
a power converter that converts direct current e into alternating current power and vice versa;
a direct current power supply connected to a direct current side of the power converter so as to be charged with and discharge direct current power; and
a rotary electric machine that is connected to an alternating current side of the power converter and includes a plurality of groups of multiphase armature windings,
the driving method comprising a determination step for determining a number of groups to be used to drive the rotary electric machine on the basis of a rotation speed of the rotary electric machine, a current flowing through the rotary electric machine, a direct current power supply voltage of the direct current power supply, and a carrier frequency of the power converter.

* * * * *